United States Patent
Niedrach et al.

[15] 3,673,069

[45] June 27, 1972

[54] CARBON DIOXIDE SENSOR

[72] Inventors: Leonard W. Niedrach; William H. Stoddard, Jr., both of Schenectady, N.Y.

[73] Assignee: General Electric Company

[22] Filed: May 3, 1971

[21] Appl. No.: 139,674

[52] U.S. Cl. .....................................204/195 G, 204/195 P
[51] Int. Cl. ....................................G01n 27/36, G01n 27/46
[58] Field of Search ........................204/1 T, 195 G, 195 P

[56] References Cited

UNITED STATES PATENTS

| | | | |
|---|---|---|---|
| 2,117,596 | 5/1938 | Bender et al. | 204/195 G |
| 3,188,285 | 6/1965 | Watanabe et al. | 204/195 G |
| 3,415,730 | 12/1968 | Haddap | 204/195 P |
| 3,498,901 | 3/1970 | Metz et al. | 204/195 G |

FOREIGN PATENTS OR APPLICATIONS

| | | | |
|---|---|---|---|
| 509,555 | 7/1939 | Great Britain | 204/195 G |

OTHER PUBLICATIONS

" National Bureau of Standards Jour. of Research," Vol. 9, 1932, pp. 833–853

*Primary Examiner*—T. Tung
*Attorney*—Richard R. Brainard, Paul A. Frank, Charles T. Watts, Paul R. Webb, Frank L. Neuhauser, Oscar B. Waddell and Joseph B. Forman

[57] ABSTRACT

A carbon dioxide sensor has a first electronically conductive metallic base member, an electrochemically active region of a continuous glaze of pH sensing glass in electrical contact with a portion of the base member, a second electronically conductive metallic base member, a second electrochemically active region of silver and silver halide in electrical contact with the second base member, a first layer of electrical insulation disposed between the first and second base members, a second layer of electrical insulation disposed over the second base member, an immobilized electrolyte contacting both electrochemically active regions, and an outer sheath of carbon dioxide permeable, ion-impermeable diffusion barrier material encapsulating at least the electrochemically active regions and the electrolyte.

6 Claims, 2 Drawing Figures

PATENTED JUN 27 1972 3,673,069
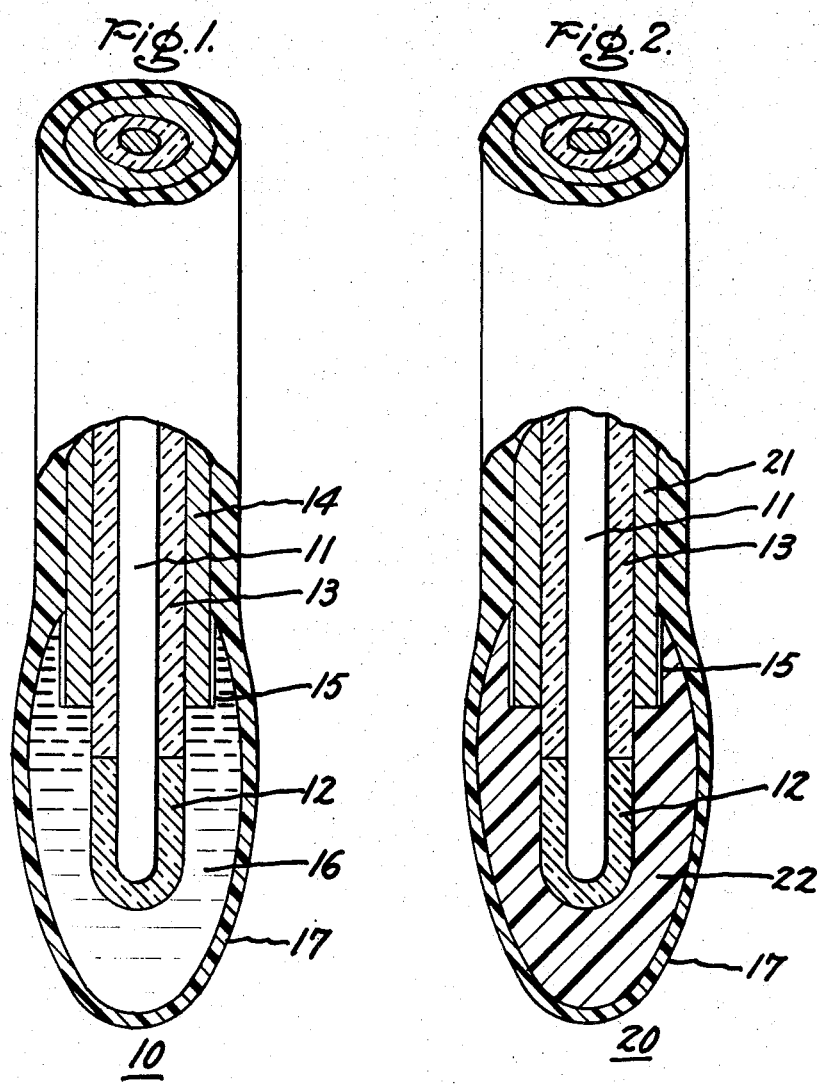
Inventors:
Leonard W. Niedrach,
William H. Stoddard Jr.,
by Paul R. Webb, II
Their Attorney.

CARBON DIOXIDE SENSOR

Reference is made to copending patent application entitled "Sensor and Method of Manufacture" filed Sept. 4, 1970, and given Ser. No. 69,650, which describes and claims a sensor including an ion exchange resin electrolyte and methods of manufacture. This copending application, in the name of Leonard W. Niedrach, is assigned to the same assignee as the present application.

Reference is made to copending patent application (RD-4269) entitled "Method of Making Ion-Selective Electrode" filed Apr. 29, 1971, and given Ser. No. 138,716, which describes a method of making an ion-selective electrode which electrode has an electronically conductive metallic base member, a continuous, thin glaze of ion-selective glass in intimate contact with a portion of the base member, and electrical insulation covering the remainder of the base member. This copending application, in the names of Leonard W. Niedrach and William H. Stoddard, Jr. is assigned to the same assignee as the present application.

This invention relates to carbon dioxide sensors and, more particularly, to carbon dioxide sensors employing as one of the sensing elements an electrochemically active region of a continuous, thin glaze of pH sensitive glass in electrical contact with a portion of the metallic base member.

Carbon dioxide sensors are known in the prior art for determining carbon dioxide content of a sample. Such a sensor has a pH sensitive electrode, an electrolyte whose pH is sensitive to the partial pressure of carbon dioxide in equilibrium with it, a counter-reference electrode insensitive to changes in pH or bicarbonate concentration, and a diffusion barrier that is permeable to carbon dioxide but otherwise isolates the electrochemical sensing elements from the system to be monitored. In operation, the terminal voltage is a definite function of the partial pressure of the carbon dioxide in equilibrium with it.

Our present invention is directed to an improved carbon dioxide sensor which is suitable for biomedical, environmental control and other applications.

The primary objects of our invention are to provide a rugged, dependable and miniaturized carbon dioxide sensor.

In accordance with one aspect of our invention, a carbon dioxide sensor comprises a first electronically conductive metallic base member, an electrochemically active region of a continuous thin glaze of pH sensitive glass in electrical contact with a portion of the base member, a second electronically conductive metallic base member, a second electrochemically active region of silver and silver halide in electrical contact with the second base member, a first layer of electrical insulation disposed between said first and second base members, a second layer of electrical insulation disposed over the second base member, an immobilized electrolyte contacting both electrochemically active regions, and an outer sheath of carbon dioxide permeable, ion-impermeable diffusion barrier material encapsulating the electrochemically active regions and the electrolyte.

These and various other objects, features and advantages of the invention will be better understood from the following description taken in connection with the accompanying drawing in which:

FIG. 1 is a sectional view of a portion of a carbon dioxide sensor made in accordance with our invention; and FIG. 2 is a sectional view of a portion of a modified carbon dioxide sensor made in accordance with our invention.

In FIG. 1 of the drawing, there is shown generally at 10 a portion of a carbon dioxide sensor embodying our invention. Sensor 10 is shown with a first elongated electronically conductive metallic base member 11 in the form of a 20 mil thick palladium wire with an electrochemically active region 12 of a continuous thin glaze of pH sensitive glass in electrical contact with the lower end portion thereof. This electrochemically active region 12 provides the sensing electrode. A first layer of electrical insulation 13 in the form of a non-sensitive glass tube surrounds base member 11 but active region 12 is exposed. A second elongated electronically conductive metallic base member 14 in the form of a silver tube surrounds at least partially the first base member 11 whereby electrical insulation 13 is disposed between base members 11 and 14. Base member 14 can be in a variety of configurations including a strip, wire, paint, etc. Such base members surround at least partially the first conductive base member. A second electrochemically active region 15 consists of silver and a silver halide on the lower portion of silver base member 14. This electrochemically active region 15 provides the reference electrode. An immobilized electrolyte 16 contacts both electrochemically active regions 12 and 15, respectively, by bridging first electrical insulation 13. A carbon dioxide diffusion barrier material 17 of silicone-polycarbonate is disposed over second base member 14 as a layer of electrical insulation and encapsulates as an outer sheath the electrochemically active regions 12 and 15, and electrolyte 16. If desired, a separate layer of electrical insulation can surround base member 14. The resulting device is a potentiometric carbon dioxide sensor.

In FIG. 2 of the drawing, there is shown generally at 20 a portion of a modified carbon dioxide sensor embodying our invention. Sensor 20 is similar in construction to sensor 10 described above. Accordingly, similar reference numerals are used for similar parts in FIG. 2. However, second elongated electronically conductive base member 21 is in the form of silver paint. Further, immobilized electrolyte 22 is an anion exchange resin of quaternized polystyrene partially in its bicarbonate form and partially in its halide form.

The carbon dioxide sensor of our invention can be formed by employing a first electronically conductive metallic base member of which a palladium metal or a metallic base member with a surface of palladium is preferred. The first electrochemically active region which can be employed for the sensing electrode is pH sensing glass. The second metallic base member is preferably silver or gold. If gold is employed, silver is deposited on at least a portion thereof. Second electrochemically active region which can be employed for the reference electrode are silver-silver halides except fluorides.

Various electrical insulating materials are useable and many of such materials can be applied by coating steps. Preferred materials include Viton rubber, silicone rubbers, and polypropylene oxides. We prefer to use a non-pH sensing glass for the electrical insulation. Various carbon dioxide diffusion barrier materials are suitable as an outer sheath to encapsulate at least the electrochemically active regions and the electrolyte. The carbon dioxide permeable, ion-impermeable diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials which have been employed include silicone-polycarbonate copolymers, Viton rubber and silicone rubbers.

An aqueous electrolyte can be employed in our invention by immobilizing the solution with a gelling agent such as Methocel gelling agent. A suitable electrolyte is provided by 0.15 M sodium chloride and 0.005 M sodium bicarbonate containing 1.1 percent of Methocel gelling agent.

An anion exchange resin can also be employed as the immobilized electrolyte in our sensor and can be applied by coating. Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application. With this anion exchange resin type carbon dioxide sensor, suitable electrolytes include a terpolymer of methyl methacrylate, divinylbenzene and 2-hydroxy-3-trimethyl-ammonium propyl methacrylate partially in the bicarbonate form and partially in the chloride form and quaternized polystyrene partially in the bicarbonate form and partially in the chloride form.

A quaternized polystyrene is a polystyrene which is partially converted to a quaternary amine derivative. The manufacture of this electrolyte involves the chloro-methylation and subsequent quaternization of polystyrene.

Equation 1

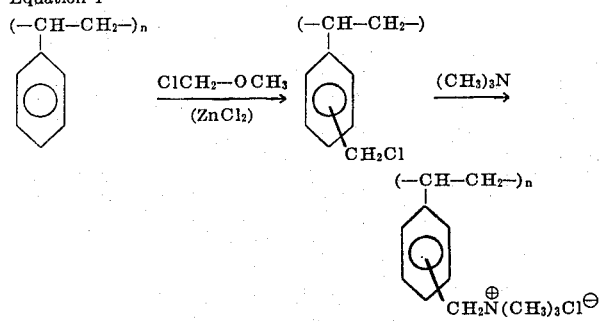

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain optimal values which correspond to chlorine contents of 4.0–6.5% for the chloromethylated but not quaternized resin, about one chloromethyl group for every five to eight repeat units. Polystyrene is generally chloromethylated in chloromethylmethylether as the alkylating agent with zinc chloride as a catalyst, without use of solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No cross-linking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20 percent water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation (2).

Equation 2

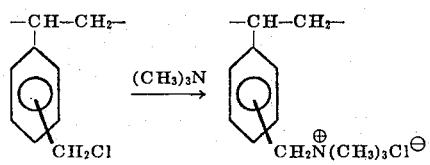

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20 percent solution in dioxane. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C in Vacuo.

With reference to FIGS. 1 and 2 of the drawing, carbon dioxide sensors are formed in accordance with our invention by employing a 20 mil palladium wire 11 as the base member upon which the successive elements are applied. This wire is the first electronically conductive metallic base member 11 of the sensor. The tip of the wire was rounded and the surface near the tip was grit blasted to promote adhesion of subsequent coatings. The tip of the wire was then plated for a distance of 1 cm with silver. The plating was done at a current of 1 ma/cm length for 10 minutes in a commercially available AgCN–NaCN plating bath.

A coating of pH sensitive glass was then added over the silver plate to provide a first electrochemically active region 13. This was done by heating the wire to 850° C. in a flowing oxygen atmosphere and then dipping the hot wire into powdered glass of −200 mesh particle size. The wire was then reheated to fuse the glass particles adhering to it, and the process was repeated until a continuous coating of the pH sensitive glass had been built up on the tip of the wire covering the silver plated segment thereof. Electrical insulation was then added in the form of a non-pH sensitive glass sleeve which was shrunken onto the wire by heating the assembly to 800° C in flowing oxygen. The insulating glass sleeve overlapped the pH sensitive glass slightly and covered the balance of the wire leaving exposed the pH sensitive tip and a short length of wire at the opposite end to which an electrical connection can be affixed. This electrode was then annealed for approximately seven hours at 435° C in air. This treatment gives improved electrical stability for measuring pH.

In FIG. 1, second electronically conductive base member 14 preferably in the form of a silver tube is slipped over glass tube 13 to surround first base member 11. In FIG. 2, second electronically conductive base member 21 is applied by painting or plating preferably silver or the gold on glass tube 13. Second electrochemically active region 15 at the one end of the second base member is silver and a silver halide such as silver chloride which chloride is applied to silver base member 14 or 21, by a chloriding step such as anodization in a chloride solution. If gold is employed as second base member 14 or 21, silver is deposited electrochemically and then silver chloride is formed on its surface. Other silver halides are suitable except for fluorides. An immobilized electrolyte 16 in FIG. 1 or an immobilized electrolyte 22 in FIG. 2 contacts both electrochemically active regions 12 and 15, respectively.

A second layer of electrical insulation can be applied over second base member 14 or 21 except for a small region at the upper end for subsequently applying an electrical lead thereto. However, we prefer to employ the subsequently applied carbon dioxide diffusion barrier in this manner thereby eliminating the need for a separate electrically insulating coating on base member 14 or 21.

If an anion exchange electrolyte 22 is employed, it is converted to a partially bicarbonate form and a partially chloride form by immersion in an aqueous KCl–KHCO₃ solution. A diffusion barrier of silicone-polycarbonate is then applied as an outer sheath 17 encapsulating the electrically active regions 12 and 15, electrolyte 22, and second current collector 21.

The resulting carbon dioxide sensor can be used for clinical or other analysis. A high impedance voltmeter is connected to the respective electrodes. The terminal voltage from the sensor in operation will be a function of the carbon dioxide partial pressure in equilibrium with it.

Reference is also made to copending patent application entitled "Sensor and Method of Manufacture" filed Oct. 15, 1970, and given Ser. No. 80,903, which describes and claims a sensor including a rigid, electrically insulating matrix and a pair of current collectors embedded in the matrix.

In another aspect of our invention employing such a matrix, a first base member is in the form of a palladium wire with an electrochemically active region in the form of a coating of pH sensitive glass at one end, and a second base member is in the form of a silver wire. These base members, which are generally parallel and spaced apart, are embedded in a rigid, electrically insulating matrix of a material such as a cured epoxy resin. The matrix insulates electrically one base member from the other base member. The glass coated tip of the first base member, and a bare tip of the second base member are exposed in an essentially planar array with one face of the matrix. The opposite ends of both base members are exposed.

The first electrochemically active region of the sensor is the pH sensitive glass in electrical contact with one exposed end of the first base member. A second electrochemically active region of silver and silver halide is formed on the adjacent exposed end of the second base member. An immobilized electrolyte of a gelled aqueous solution or an ion exchange resin electrolyte of quaternized polystyrene partially in its bicarbonate form and partially in its chloride form contacts both of the electrochemically active regions. An outer sheath of carbon dioxide diffusion barrier material of silicone-polycarbonate encapsulates the active regions and the electrolyte. An electrical lead can also be in contact with each of the base members at the opposite end of the matrix.

Examples of carbon dioxide sensors made in accordance with our invention are as follows:

EXAMPLE 1

A carbon dioxide sensor was formed in accordance with the above description and as shown generally in FIG. 1 of the drawing. The first base member was in the form of a 20 mil palladium wire. The tip of the wire was rounded and the surface near the tip was grit blasted to promote adhesion of subsequent coatings. The tip of the wire was then plated for a distance of 1 cm with silver. The plating was done at a current of 1 ma/cm length for 10 minutes in a commercially available AgCN–NaCN plating bath.

A coating of pH sensitive glass similar in composition to Corning type 015 glass was then added over the silver plate to provide a first electrochemically active region. This was done by heating the wire to 850° C in a flowing oxygen atmosphere and then dipping the hot wire into powdered glass of −200 mesh particle size. The wire was then reheated to fuse the glass particles adhering to it, and the process was repeated until a continuous coating of the pH sensitive glass had been built up on the tip of the wire covering the silver plated segment thereof. Electrical insulation was then added in the form of a non-pH sensitive glass sleeve which was shrunken onto the core wire by heating the assembly to 800° C in flowing oxygen. The insulating glass sleeve overlapped the pH sensitive glass slightly and covered the balance of the wire leaving exposed the pH sensitive tip and a short length of wire at the opposite end to which an electrical connection was later affixed. This electrode was then annealed for approximately seven hours at 435° C in air. This treatment gives improved electrical stability for measuring pH. The second base member was applied in the form of a 30 mil silver tube slipped over the first insulating glass and sealed with epoxy cements. A gap was left between the first active region of pH sensitive glass and the silver tube. The second electrochemically active region was of silver and silver chloride at the lower end of the tube which was provided by chloriding by anodization in 0.1 N HCl acid solution using a platinum flag as a counter electrode. An immobilized electrolyte was applied in contact with both electrochemically active regions by immersing the end of the structure in an aqueous solution of 0.15 M sodium chloride and 0.005 M sodium bicarbonate containing 1.1 percent of Methocel gelling agent.

A second layer of electrical insulation was then applied over the second base member of the device by immersing the structure in a solution of a silicone-polycarbonate resin. This material is both a diffusion barrier material and has electrical insulation properties. The structure was covered with the same respective material whereby in addition to a layer being formed over the second current collector a carbon dioxide diffusion barrier also encapsulated both of the electrically active regions and the electrolyte. The resulting structure was a carbon dioxide sensor.

EXAMPLE 2

The above sensor formed in Example 1 was tested by measuring its terminal voltage with a high impedance millivoltmeter while immersed under 0.15 M NaCl solution at 25° C and in equilibrium with air containing various percentages of carbon dioxide as set forth below in Table I. In an ideal aqueous electrolyte system containing bicarbonate ion the anticipated voltage change is 59 millivolts per decade change in carbon dioxide partial pressure at 25° C. The voltage change of the present sensor corresponds to a slope of approximately 56 millivolts per decade change.

TABLE I

| Percent $CO_2$ in Atmosphere | Terminal Voltage, Millivolts (mV) |
| --- | --- |
| 10.2 | 204.1 |
| 5.0 | 188.2 |
| 2.13 | 165.8 |
| 0.99 | 147.8 |

EXAMPLE 3

A carbon dioxide sensor was formed in accordance with the above description and as shown generally in FIG. 2 of the drawing. However, after the first base member with first electrically active region and glass insulation was assembled, the second base member was applied as a layer of silver paint to the insulating glass. The silver paint was applied from a solution having Alkanex resin as the solvent. A gap was left above the upper end of the pH sensitive glass. A band of the silver was chlorided as in Example 1. The end of the structure had applied thereon an anion exchange resin electrolyte of quaternized polystyrene in the chloride form having an ion exchange capacity of 1.4 milliequivalents per gram. The electrolyte layer was applied by immersing one end of the structure in a solution of the resin in a mixture of chloroform-methanol to contact both electrochemically active regions. The structure was then heated in nitrogen at 50° C for 10 minutes to eliminate any residual solvents.

The electrolyte was converted to a partially bicarbonate form and partially chloride form. The conversion of the electrolyte was accomplished by immersing the structure in an aqueous 0.075 M sodium chloride and 0.075M sodium bicarbonate solution to convert the electrolyte to a mixed bicarbonate-chloride form of resin. The structure was then rinsed briefly in water and dried for about 1 minute in flowing nitrogen gas at 50° C.

A second layer of electrical insulation was then applied over the second current collector of the device by immersing the structure in a solution of a silicone-polycarbonate resin. This material is both a diffusion barrier material and has electrical insulation properties. The structure was covered with the same respective material whereby in addition to a layer being formed over the second current collector a carbon dioxide diffusion barrier also encapsulated both of the electrically active regions and the electrolyte. The resulting structure was a carbon dioxide sensor.

EXAMPLE 4

The above sensor formed in Example 3 was tested by measuring its terminal voltage with a high impedance millivoltmeter while immersed under 0.15 M NaCl solution at 25° C in equilibrium with air containing various percentages of carbon dioxide as set forth below in Table II. In an ideal aqueous electrolyte system containing bicarbonate ion the anticipated voltage change is 59 millivolts per decade change in carbon dioxide partial pressure at 25° C. The voltage change of the present sensor corresponds to a slope of approximately 45 millivolts per decade change.

TABLE II

| Percent $CO_2$ in Atmosphere | Terminal Voltage, Millivolts (mV) |
| --- | --- |
| 10.1 | 96.6 |
| 5.0 | 83.2 |
| 2.13 | 66.5 |
| 0.99 | 51.8 |

While other modifications of the invention and variations thereof which may be embraced within the scope of the invention have not been described, the invention is intended to include such as may be embraced within the following claims.

What we claim as new and desire to secure by Letters Patent of the United States is:

1. A carbon dioxide sensor comprising a first electronically conductive metallic base member, an electrochemically active region of a continuous thin glaze of pH sensitive glass in electrical contact with a portion of the base member, a second electronically conductive metallic base member, a second electrochemically active region of silver and silver halide in electrical contact with the second base member, the first and second base members being insulated electrically from each other, an immobilized electrolyte contacting both electrochemically active regions, and an outer sheath of carbon dioxide permeable, ion-impermeable diffusion barrier material encapsulating at least the electrochemically active regions and the electrolyte.

2. A carbon dioxide sensor as in claim 1, in which the second base member surrounds at least partially the first base member, a first layer of electrical insulation is disposed between the base members and a second layer of electrical insulation is disposed over the second base member.

3. A carbon dioxide sensor as in claim 2, in which the first base member is a palladium wire, the first electrochemically active region is pH sensitive glass, the second base member is silver, the second electrochemically active region is silver and silver chloride, the electrolyte is an immobilized aqueous solution containing chloride ions and bicarbonate ions, the first insulation is non-pH sensitive glass, and the second insulation and diffusion barrier are silicone-polycarbonate.

4. A carbon dioxide sensor as in claim 2, in which the first base member is a palladium wire, the first electrochemically active region is pH sensitive glass, the second base member is silver, the second electrochemically active region is silver and silver chloride, the electrolyte is quaternized polystyrene partially in its bicarbonate form and partially in its chloride form, the first insulation is non-sensitive glass, and the second insulation and diffusion barrier are silicone-polycarbonate.

5. A carbon dioxide sensor as in claim 1, in which the first electronically conductive metallic base member is a palladium wire with an external coating of silver.

6. A carbon dioxide sensor as in claim 1, in which the immobilized electrolyte is an anion exchange resin.

* * * * *